July 11, 1933.  O. H. BANKER  1,917,484
CLUTCH
Filed Dec. 22, 1930  2 Sheets-Sheet 1
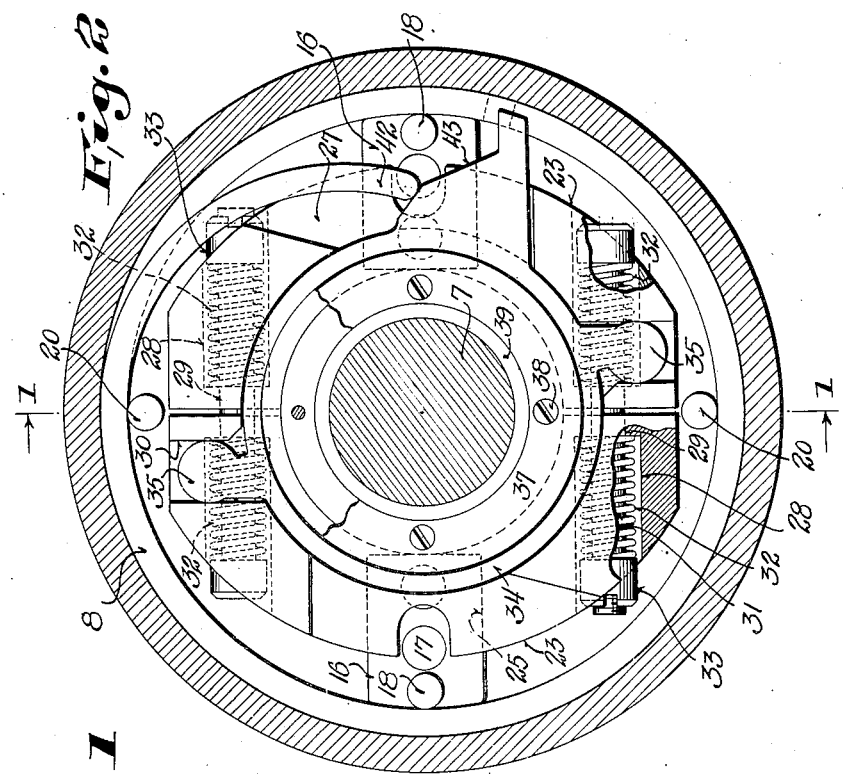
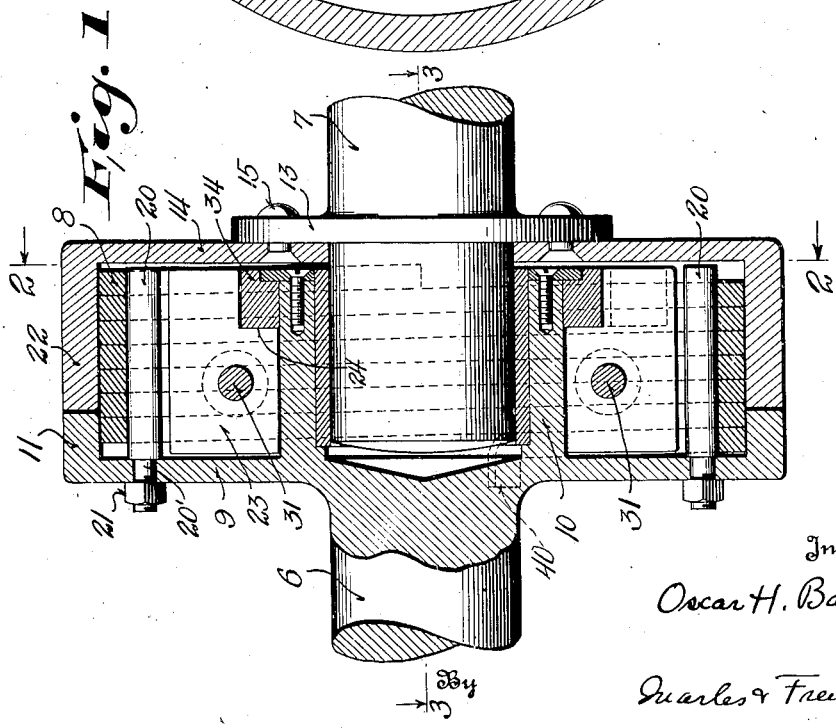
Inventor
Oscar H. Banker
By Marles & French
Attorneys July 11, 1933.　　　　O. H. BANKER　　　　1,917,484
CLUTCH
Filed Dec. 22, 1930　　　2 Sheets-Sheet 2
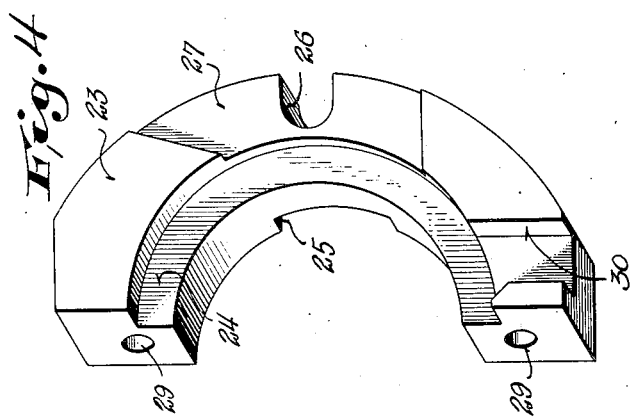
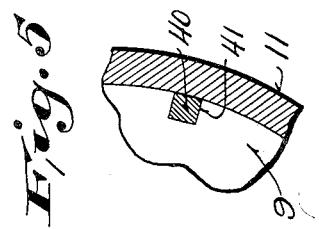
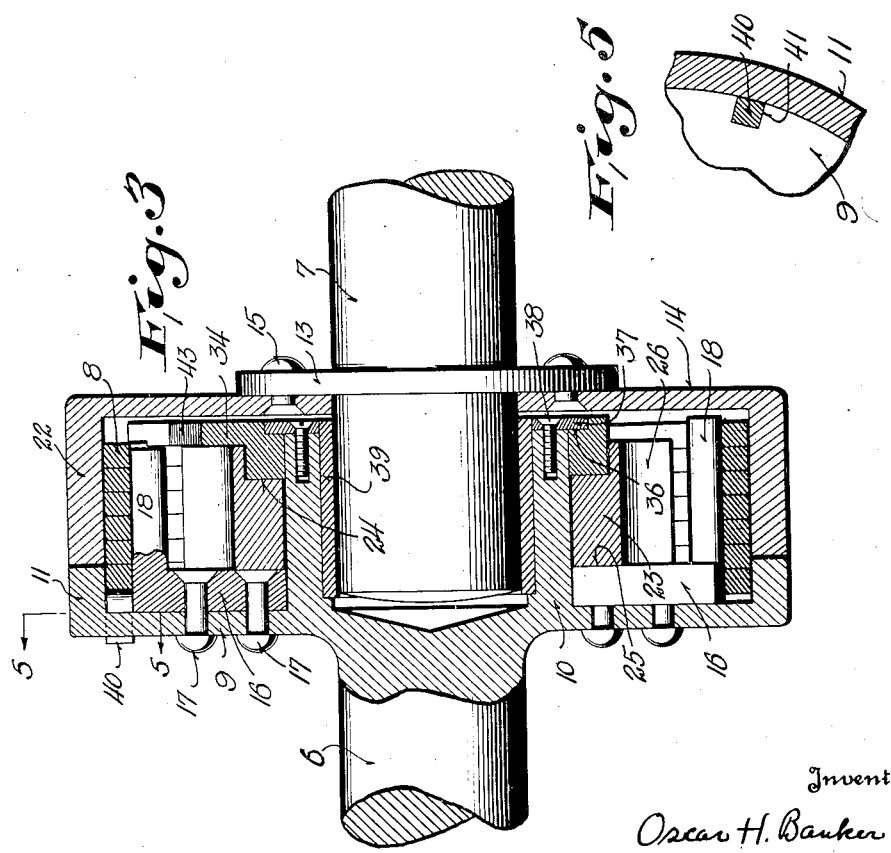
Inventor
Oscar H. Banker
By
Marles & French
Attorneys Patented July 11, 1933

1,917,484

UNITED STATES PATENT OFFICE

OSCAR H. BANKER, OF CHICAGO, ILLINOIS, ASSIGNOR, BY MESNE ASSIGNMENTS, TO NEW PRODUCTS CORPORATION, A CORPORATION OF DELAWARE

CLUTCH

Application filed December 22, 1930. Serial No. 504,018.

This invention relates to clutches and more particularly to automatic clutches of the type wherein a coiled spring clutching element is actuated by a speed responsive mechanism.

One object of the invention is to provide a clutch of the character or type above described wherein the spring clutch element is controlled by a member operated by a governor mechanism including governor weights whose movements are synchronized by said member.

A further object of the invention is to improve generally, clutches of the type above described by controlling the pressure exerted by the actuator on the spring clutch element and preferably in such a way as to keep the pressure substantially constant.

A further object of the invention is to provide a governor controlled spring clutch in which the governor weights form a support for the spring clutch element when in expanded condition and also one in which said weights are not checked in their travel by the member that initially moves the spring clutch element.

The invention further consists in the several features hereinafter set forth and more particularly defined by claims at the conclusion hereof.

In the drawings, Fig. 1 is a vertical sectional view taken on the line 1—1 of Fig. 2.

Fig. 2 is a transverse sectional view taken on the line 2—2 of Fig. 1.

Fig. 3 is a horizontal sectional view taken on the line 3—3 of Fig. 1.

Fig. 4 is a detail sectional view of one of the governor weights.

Fig. 5 is a detail sectional view taken on the line 5—5 of Fig. 3.

In the drawings, the numeral 6 designates a drive shaft, 7 a driven shaft, and 8 a clutch element in the form of a coiled spring. In addition to the shaft 6, the driving element of the clutch includes a disk 9 having annular flange portions 10 and 11.

In addition to the shaft 7, the driven element of the clutch includes a flange 13 on this shaft to which a clutch drum 14 is secured in any suitable manner as by rivets 15.

The driving element also has guide blocks 16 secured thereto as by rivets 17, said blocks having pin extensions 18 and being diametrically disposed. Other pins 20 diametrically disposed and at right angles with the pins 18 and having threaded extensions 20' secured to the disk 9 by nuts 21' cooperate with said pins 18 to determine the release position of the spring 8, it being understood that in this release position there is a slight clearance between said spring and the flange 22 of the drum 14 which has been shown on the drawings by the relatively heavy black lines.

A pair of governor weights or speed responsive elements 23 are mounted within the annular enclosure between the driving and driven elements and are generally of semi-cylindrical shape to fit around the annular flange portion 10 of the driver element. Each of these weights has a semi-cylindrical recess 24 in one side, a slot or key-way 25 in its other side, a transverse pin clearance slot 26, and a clearance recess 27, which while functioning as such for one of the weights is also provided for the other to balance the weights. Each weight also has enlarged bores 28 at each end alined with bores 29 of reduced diameter and one end of each weight has a pivot recess 30 formed therein.

For tensioning the weights, a bolt or headed rod 31 passes through the alined bores 28 and 29 of the weights, and coiled springs 32 surround each bolt within the bores 28 and are interposed between the weights and the head of the bolt and adjusting nut 33 respectively, the nuts being mounted for adjustment on the threaded ends of the bolt to vary the tension to be overcome by the weights as they move outwardly under the action of centrifugal force set up by the rotation of the driver element, it being noted that the slots 25 of the weights slidably fit the guide blocks 16, which form a driving connection for the weights with the driver.

An equalizing or synchronizing member 34 for the governor element is provided in the form of a ring having a hub portion rotatable in the recess 24 and provided with curved pivot projections 35 that have a sliding and pivotal connection with the slots or pivot recesses 30 in said weights, said member having an annular recess 36 to receive the outer portion of a ring or collar 37 secured to the flange 10 by screws 38 and serving to restrain endwise movement of the member 34 and the weights 23.

The inner end of the driven shaft 7 preferably projects into the cavity formed by the flange portion 10 and is journalled in a bushing 39 in said flange portion.

One end 40 of the spring 8 is bent at right angles to project through an opening 41 in the disk 9 adjacent the flange 11 while the other end 42 is free and projects down into the path of movement of a cam projection 43 formed on the member 34 as shown in Fig. 2 and working in recess 27 of one of the weights 23.

With the above construction when the speed of the driving element becomes sufficient to overcome the tension exerted by the springs 32 on the weights 23, the same move radially outwardly and as they do so they each exert a rotational movement on the member 34 whose cam projection 43 thereupon pushes against the end 42 of the spring and thus moves it into clutching engagement with the drum 14. As soon as the coiled clutch member engages with the drum 14 of the driven element its coils will gradually expand into engagement with the drum and the latter will then be driven thereby, the spring being held in this position so long as the weights 23 are in an expanded position. Thus the driven element is efficiently clutched to its driver until a reduction in speed of the driver causes the springs 32 to retract the weights which then move inwardly swinging the member 34 to a release position to allow the clutch element 8 to retract sufficienly to release iself from engagement with the drum 14 of the driven element.

From the foregoing it will be noted that the member 34 not only serves to equalize the action of the governor weights so that they will move equally even though there may be some difference in the tensions of each of the individual springs 32 but at the same time it actuates or is the connecting link between the speed responsive element and the spring clutch element 8.

It is also to be noted that if the pressure on the end 42 of the spring becomes excessive, said end may slip along the cam surface 43 and this slippage is preferably so controlled by the cam so as to provide a substantially constant pressure of actuator or member 34 on the clutch element.

It is also to be noted that the outer faces of the weights or speed responsive elements 23 are cylindrically curved to conform to the curvature of the spring clutch member 8 so that when said elements move out they may engage the inner side of said member 8 to give support to the same and that this movement or the movement of said elements 23 to the extent of their travel is not checked by the actuator member 34, because of the sliding and pivotal connection between these parts afforded by the slots 30 and projections 35, or by the free end of the spring.

I desire it to be understood that this invention is not to be limited to any particular form or arrangement of parts except in so far as such limitations are included in the claims.

What I claim as my invention is:

1. In a clutch of the character described, the combination with a rotatable driving member and a rotatable driven member, of a coil clutch spring on said driving member engageable with said driven member, said driving member provided with radially disposed guides, weights slidably mounted on said guides, spring means resisting the outward movement of said weights until said driving member reaches a predetermined speed, an equalizing member rotatable with and relative to said driving member and operatively connected with each of said weights and having a part engageable with said clutch spring to move the same to engage said driven member on the outward movement of said weights.

2. In a clutch of the character described, the combination with a rotatable driving member and a rotatable driven member, of a coil clutch spring secured at one end portion to said driving member and engageable with said driven member and having a free end, speed responsive elements rotatable with and movable relative to said driving member, spring means resisting the outward movement of said elements until said driving member reaches a predetermined speed, and an equalizing member for said speed responsive elements rotatable with and relative to said driving member and having a pressure controlling cam surface engageable with the free end of said spring to move the same into clutch engagement with said driven member under the action of said elements.

3. In a clutch of the character described, the combination with a rotatable driving member and a rotatable driven member, of a coil clutch spring secured at one end to said driving member and engageable with said driven member and having a free end, said driving member provided with radially disposed guides, oppositely movable weights slidably mounted on said guides, spring means resisting the outward movement of said weights until said driving member reaches a predetermined speed, an equalizing member rotatable with and relative to said driving member and operatively connected with each of said weights and having a cam projection engageable with the free end of said spring to move the same into clutch engagement with said driven member on the outward movement of said weights.

4. In a clutch of the character described, the combination with a rotatable driving member and a rotatable driven member, of a coil clutch spring secured at one end portion to said driving member and engageable with said driven member and having a free end, speed responsive elements associated with said driving member, and a movable member actuated by said speed responsive elements and having a cam projection engageable with the free end of said spring to exert a substantially constant pressure on said spring regardless of the travel of said member.

5. In a clutch of the character described, the combination with a rotatable driving member and a rotatable driven member, of a coiled spring on said driving member engageable with said driven member, speed responsive elements rotatable with and movable relative to said driving member and working within said spring and having curved surfaces movable into contacting engagement with said spring when in expanded position, and means for operatively connecting said elements to said spring to actuate the same.

6. In a clutch of the character described, the combination with a rotatable driving member and a rotatable driven member, of a coil clutch spring connected to said driving member and engageable with said driven member and having a free end, speed responsive elements having a driving connection with said driving member and movable relative thereto, resilient retaining means resisting the outward movement of said elements, an equalizing member rotatable with and relative to said driving member and operatively connected to said coil clutch spring to move the same, and connections between said speed responsive elements and said equalizing member for moving said equalizing member by said elements and allowing full movement of said elements unchecked by said equalizing member.

7. In a clutch of the character described, the combination with a rotatable driving member and a rotatable driven member, of a coiled spring secured at one end portion to said driving member and engageable with said driven member and having a free end, speed responsive means actuated by said driving member and including a member provided with a cam surface engageable with the free end of said spring to move the same into clutch engagement with said driven member when said driving member reaches a predetermined speed.

8. In a clutch of the character described, the combination with a rotatable driving member and a rotatable driven member, of a coil clutch spring secured at one end portion to said driving member and engageable with said driven member and having a free end, speed responsive elements associated with said driving member, and an actuator moved by said speed responsive elements and engaging the free end of said coil spring, said actuator having an initial engaging portion for applying circumferential pressure to said coil spring and a final engaging portion for maintaining said pressure without increasing it and for permitting partial release of said pressure should it become excessive for any reason.

In testimony whereof, I affix my signature.

OSCAR H. BANKER.